US009850776B2

(12) United States Patent
Hurlin et al.

(10) Patent No.: US 9,850,776 B2
(45) Date of Patent: Dec. 26, 2017

(54) VARIABLE-SECTION NOZZLE, AND AIRCRAFT TURBOJET ENGINE NACELLE EQUIPPED WITH SUCH A NOZZLE

(71) Applicant: AIRCELLE, Gonfreville l'Orcher (FR)

(72) Inventors: Hervé Hurlin, Igny (FR); Hakim Maalioune, Orgeval (FR); Olivier Kerbler, Antony (FR)

(73) Assignee: AIRCELLE, Gonfreville l'Orcher (FR)

( * ) Notice: Subject to any disclaimer, the term of this patent is extended or adjusted under 35 U.S.C. 154(b) by 561 days.

(21) Appl. No.: 14/492,274

(22) Filed: Sep. 22, 2014

(65) Prior Publication Data
US 2015/0345423 A1    Dec. 3, 2015

Related U.S. Application Data

(63) Continuation of application No. PCT/FR2013/050585, filed on Mar. 19, 2013.

(30) Foreign Application Priority Data

Mar. 20, 2012 (FR) ...................................... 12 52472

(51) Int. Cl.
*F01D 17/14* (2006.01)
*F02K 1/18* (2006.01)
(Continued)

(52) U.S. Cl.
CPC .............. *F01D 17/141* (2013.01); *F02K 1/06* (2013.01); *F02K 1/08* (2013.01); *F02K 1/12* (2013.01);
(Continued)

(58) Field of Classification Search
CPC ........ F01D 17/141; F01D 17/20; F01D 17/22; F01D 17/24; F05D 2260/407; F02K 1/06;
(Continued)

(56) References Cited

U.S. PATENT DOCUMENTS 2,623,352 A    12/1952 Sedille et al.
3,040,523 A     6/1962 Price
(Continued)

FOREIGN PATENT DOCUMENTS

EP    1 482 159 A2    12/2004
EP    2 098 704 A2     9/2009
EP    2 103 784 A2     9/2009

OTHER PUBLICATIONS

International Search Report dated Jul. 16, 2013 in International Application No. PCT/FR2013/050585.

*Primary Examiner* — Gerald L Sung
*Assistant Examiner* — Scott Walthour
(74) *Attorney, Agent, or Firm* — Burris Law, PLLC

(57) ABSTRACT

A variable-section nozzle for an aircraft nacelle includes a deformable portion of which is movable between a narrow section position and a wide section position. In particular, the variable-section nozzle includes piezoelectric actuators and a controller to control the piezoelectric actuators in order to displace the deformable portion between the narrow and wide section positions. The piezoelectric actuators can be disposed on at least one faces of the deformable portion or be disposed end-to-end to form actuating rods.

7 Claims, 4 Drawing Sheets

(51) Int. Cl.
  *F02K 1/06* (2006.01)
  *F02K 1/15* (2006.01)
  *F02K 1/12* (2006.01)
  *F01D 17/22* (2006.01)
  *F01D 17/20* (2006.01)
  *F02K 1/08* (2006.01)
  *F02K 1/09* (2006.01)
  *F01D 17/24* (2006.01)
  *F02K 1/10* (2006.01)
  *F02K 1/11* (2006.01)

(52) U.S. Cl.
  CPC .............. *F02K 1/1207* (2013.01); *F02K 1/15* (2013.01); *F02K 1/18* (2013.01); *F01D 17/20* (2013.01); *F01D 17/22* (2013.01); *F01D 17/24* (2013.01); *F02K 1/085* (2013.01); *F02K 1/09* (2013.01); *F02K 1/10* (2013.01); *F02K 1/11* (2013.01); *F02K 1/123* (2013.01); *F02K 1/1215* (2013.01); *F02K 1/1223* (2013.01); *F02K 1/1238* (2013.01); *F02K 1/1246* (2013.01); *F02K 1/1253* (2013.01); *F02K 1/1261* (2013.01); *F02K 1/1269* (2013.01); *F02K 1/1276* (2013.01); *F02K 1/1284* (2013.01); *F02K 1/1292* (2013.01); *F05D 2260/407* (2013.01); *Y02T 50/672* (2013.01)

(58) Field of Classification Search
  CPC ... F02K 1/08; F02K 1/085; F02K 1/09; F02K 1/10; F02K 1/11; F02K 1/12; F02K 1/1207; F02K 1/1215; F02K 1/1223; F02K 1/123; F02K 1/1238; F02K 1/1246; F02K 1/1253; F02K 1/1261; F02K 1/1269; F02K 1/1276; F02K 1/1284; F02K 1/1292; F02K 1/15; F02K 1/18
  See application file for complete search history.

(56) References Cited

U.S. PATENT DOCUMENTS

| | | | |
|---|---|---|---|
| 2002/0125340 A1* | 9/2002 | Birch | F02K 1/383 239/265.11 |
| 2004/0237534 A1* | 12/2004 | Webster | B64D 33/04 60/771 |
| 2005/0039437 A1* | 2/2005 | Lair | F01D 17/16 60/204 |
| 2008/0000235 A1* | 1/2008 | Hanson | F01D 17/141 60/770 |
| 2008/0211353 A1* | 9/2008 | Seeley | H01L 41/094 310/359 |
| 2010/0006708 A1* | 1/2010 | Law | B64C 3/18 244/219 |
| 2010/0224734 A1 | 9/2010 | Grip | |
| 2011/0180145 A1 | 7/2011 | Dos Santos e Lucato et al. | |

* cited by examiner

VARIABLE-SECTION NOZZLE, AND AIRCRAFT TURBOJET ENGINE NACELLE EQUIPPED WITH SUCH A NOZZLE

CROSS-REFERENCE TO RELATED APPLICATIONS

This application is a continuation of International Application No. PCT/FR2013/050585, filed on Mar. 19, 2013, which claims the benefit of FR 12/52472, filed on Mar. 20, 2012. The disclosures of the above applications are incorporated herein by reference.

FIELD

The present disclosure relates to a nacelle for an aircraft engine, with a variable-section nozzle.

BACKGROUND

The statements in this section merely provide background information related to the present disclosure and may not constitute prior art.

An aircraft engine nacelle allows channeling external air toward this engine, and providing high-velocity ejection of this air to provide the necessary thrust.

In the bypass turbojet engines, the airflow blown by the fan is divided, downstream thereof, into a primary flow (also called "hot" flow) which penetrates into the heart of the turbojet engine to undergo therein several compressions and an expansion, and into a secondary flow (also called "cold" flow), which circulates within a substantially annular flow path, defined on the one hand by an engine fairing (internal fixed structure, also called "IFS") and on the other hand by the outer fairing of the nacelle.

The cold airflow, coming out downstream of the nacelle via an outlet nozzle defined by the downstream edge of this nacelle, provides the essential part of the thrust.

In the case of engines with a very high dilution rate, for aerodynamic optimization reasons to provide a proper operation of the fan and also to optimize fuel consumption, it is quite advantageous to adjust the cold airflow outlet section downstream of the nacelle: it is indeed useful to increase this section during takeoff and landing phases, and reduce it during the cruise phases: this is often referred to as adaptive nozzle, or even "VFN" (Variable Fan Nozzle).

Examples of such adaptive nozzles are known for example from patent applications FR10/52971, FR10/53282, FR10/57240 filed by the applicant.

Conventionally, the variation of the cold flow outlet section is carried out by means of hydraulic or electromechanical actuators, allowing displacing all or part of the outer fairing of the nacelle.

The use of such actuators results in additional weight, space and cost. Their integration into the nacelle, already overcrowded with a large number of members, presents a number of technical difficulties.

SUMMARY

The present disclosure provides a variable-section nozzle for an aircraft nacelle, at least a portion of which is movable between at least a position of smaller section and at least a position of larger section, and comprising means for displacing said portion between said positions, these displacing means comprising on the one hand piezoelectric actuators, and on the other hand means for controlling these actuators, said actuators being disposed in one selected of the two following manners:

said actuators are disposed on both sides of said portion,
said actuators are disposed end-to-end to form actuating rods.

With these features, small-size, lightweight and space-saving displacing means are obtained, which can be controlled by a suitable supply in electrical voltage.

According to other features of the present disclosure:
said actuators are bonded onto said deformable movable portion;
said movable portion comprises at least one hinged flap;
movement amplification means are interposed between said rods and said movable portion: these amplifying means, which can consist for example of a lever arm, allow converting the small displacements of the piezoelectric actuators, into displacements with greater amplitude;
piezoelectric sensors are positioned to detect the position of said movable portion: as a property of the piezoelectric elements indeed is that they can be used in the reverse direction, that is to say they can generate an electrical voltage depending on the displacements to which they are subjected;
said control means comprise on the one hand an electronic supervision module able to send a control voltage into said piezoelectric actuators, and on the other hand an electronic acquisition module, able to receive a position voltage from said piezoelectric sensors, these two modules defining a servo loop.

The present disclosure also relates to a nacelle, characterized in that it comprises a variable-section nozzle in accordance with the foregoing.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
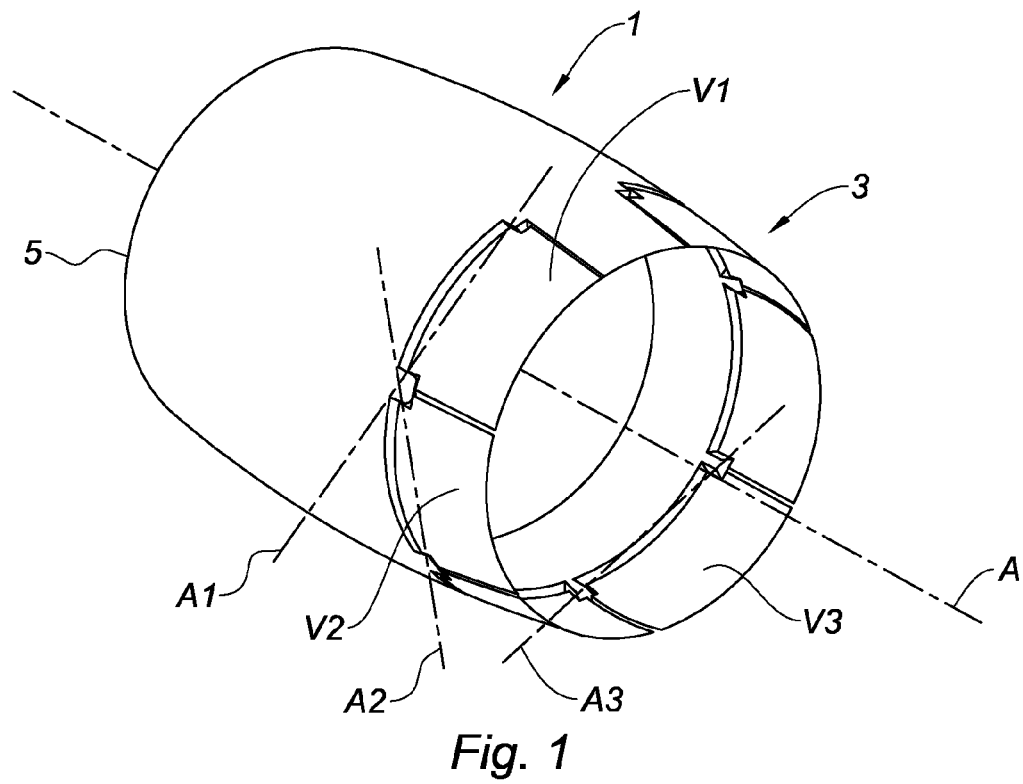
FIG. 1 is a perspective view of a nacelle for an aircraft turbojet engine, equipped with a variable-section nozzle in accordance with the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring now to FIG. 1, which shows a nacelle 1 for an aircraft turbojet engine of a longitudinal axis A, equipped with a variable-section nozzle 3 in accordance with the present disclosure.

In this FIG. 1, the upstream of the nacelle is shown on the left-hand side, and the downstream of this nacelle on the right-hand side.

Thus, in operation, air enters through the air inlet 5 of the nacelle, and exits through the variable-section nozzle 3.

In the relevant field of art, it is desirable to vary the section of the nozzle 3, during the various phases of the aircraft flight.

In the form shown in FIG. 1, this variation in the nozzle outlet section is obtained by rotating the movable flaps V1, V2, V3, . . . around respective axes A1, A2, A3, . . . , these axes being substantially perpendicular to the longitudinal A axis of the nacelle.

Conventionally, this rotation is obtained by means of hydraulic or electromechanical actuators.

In the present disclosure, these conventional actuators are replaced by piezoelectric actuators.

Figure 2:
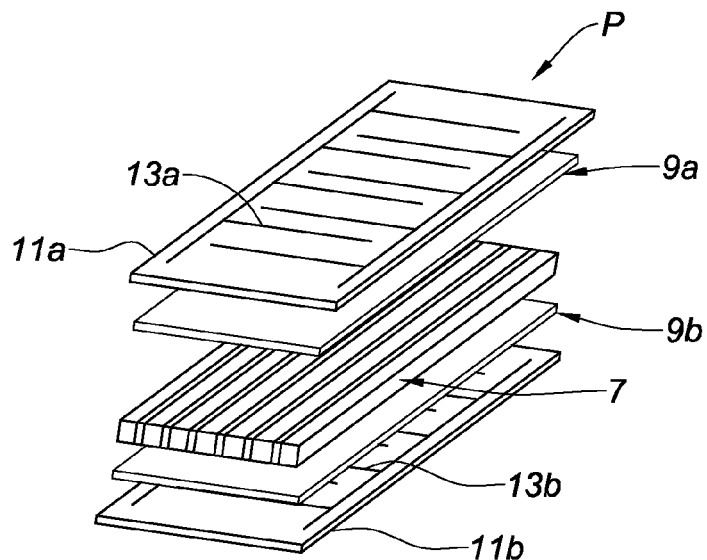
FIG. 2 is an exploded perspective view of a piezoelectric actuator equipping the nacelle of FIG. 1.

FIG. 2 shows an example of piezoelectric element which may be involved in making these actuators.

Such a piezoelectric element can typically comprise a multilayer complex, formed with piezo-ceramic crystals 7 sandwiched between two layers 9a, 9b of epoxy, these being likewise sandwiched between two layers of polyimides 11a, 11b, in which electrodes 13a, 13b are embedded.

Such piezoelectric elements are marketed for example by the company SMART MATERIAL.

When an electrical voltage is passed into the electrodes 13a, 13b, the piezo-ceramic fibers 7 are deformed, leading to a variation in the thickness of the element shown in FIG. 2.

Conversely, when this element is subjected to stresses coming from the surrounding members, it causes a variation in the electrical voltage measured to the terminals of these electrodes 13a, 13b.

The principle of the present disclosure consists in taking advantage of these properties of the piezoelectric element shown in FIG. 2, to allow displacement of the movable portions of the variable-section nozzle 3.

Thus, in the form of FIG. 1, several piezoelectric elements P can be stacked so that when they are subjected to an electrical voltage, they cause a displacement of the flaps V1, V2, V3, . . . .

Figure 3:
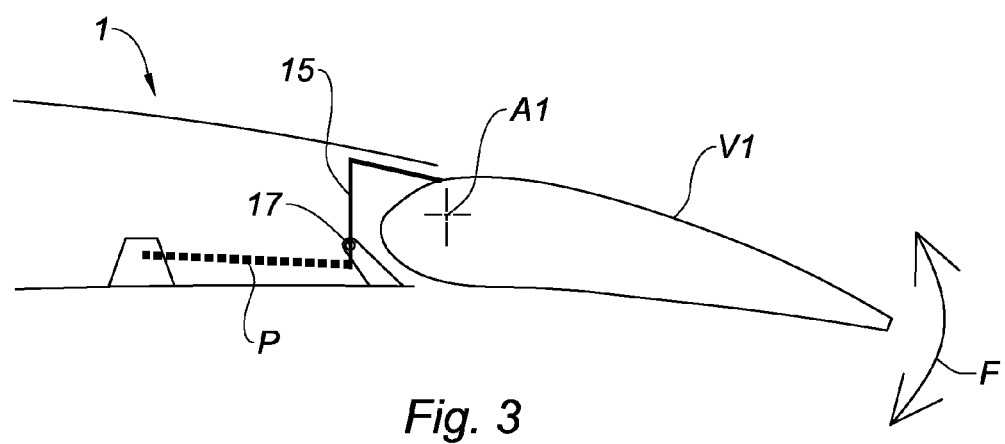
FIG. 3 is a axial sectional schematic view of the actuating mechanism of the nozzle flaps of FIG. 1.

More specifically, as is shown in FIG. 3, a system for amplifying the movements of the piezoelectric elements P can be considered, comprising, for example, an arm 15 hinged around an axis 17 placed downstream of the nacelle 1, interposed between on the one hand the piezoelectric stack P, and on the other hand each flap V1, V2, V3, . . . , hinged around its respective axis A1, A2, A3, . . . .

The system shown in FIG. 3 allows thus, through a lever arm effect, imparting to the flaps V1, V2, V3, . . . the desired movement amplitude, both outwardly and inwardly of the nacelle, as indicated by the arrow F.

Figure 4:
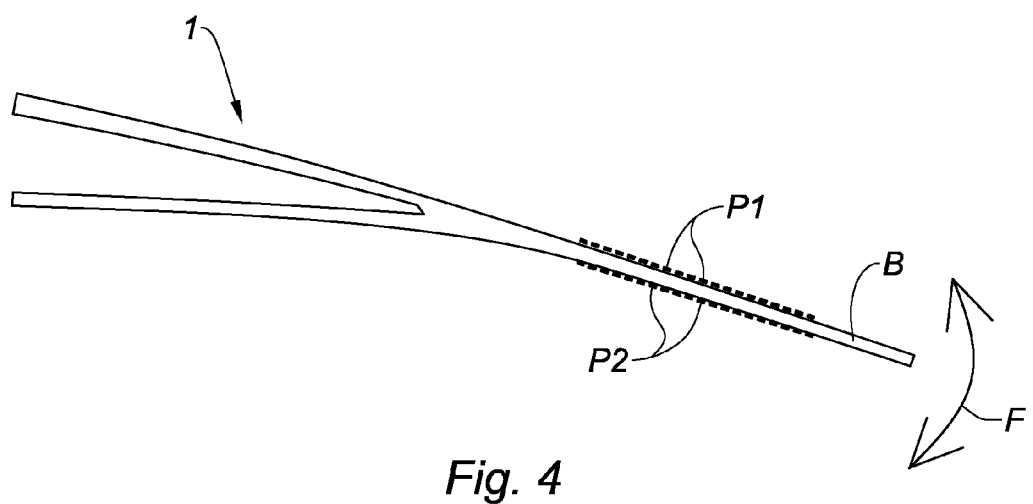
FIGS. 4, 5 and 6 are views similar to those of FIG. 3 of other forms of a variable-section nozzle according to the present disclosure.

In the alternative shown in FIG. 4, there is no longer any flap V as shown in FIG. 1, but the downstream edge B of the nacelle 1 is deformable.

This may be obtained for example by making this edge in a fine thickness sheet.

In this case, in order to allow the displacements of the downstream edge of the nozzle B so as to vary the nozzle outlet section, piezoelectric elements P1, P2, are fixed on the extrados and the intrados of the edge B.

Note that we could consider fixing such piezoelectric elements only on one of the faces of this edge B.

These piezoelectric elements can be fixed for example by bonding onto the edge B.

In the event where the edge B is made of a composite material, we can consider embedding the piezoelectric elements P1, P2 in the mass of the composite.

With appropriate electrical controls of these piezoelectric elements P1, P2, the edge B can be opened outwardly of the nacelle, or pushed inwardly thereof, thus providing the means for varying the outlet nozzle section of this nacelle.

Figure 5:
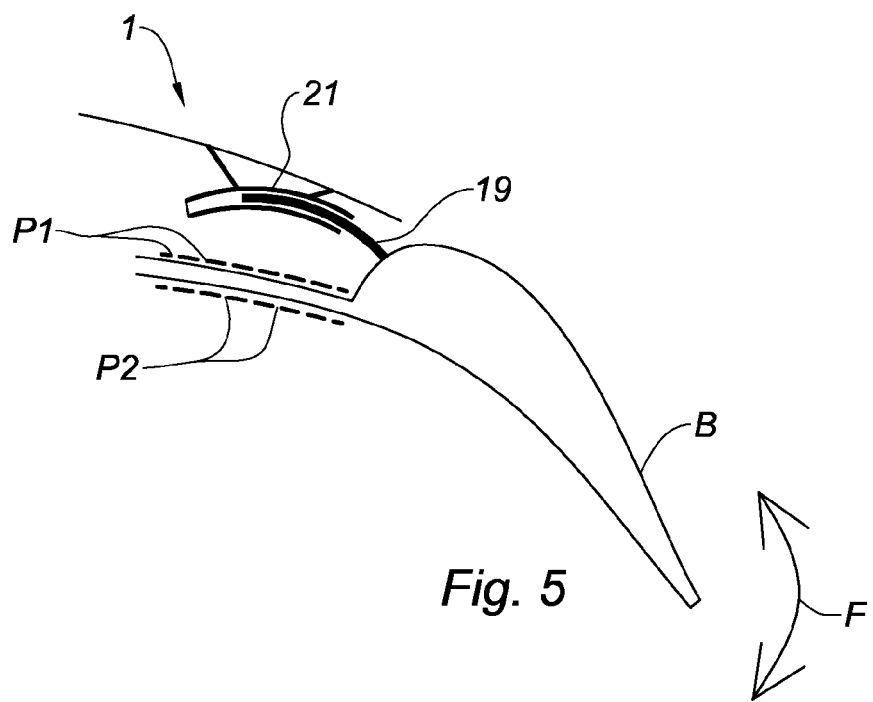

In the form of FIG. 5, the piezoelectric elements P1, P2 again allow deforming the edge B inwardly or outwardly of the nacelle, as indicated by the arrow F, while noting that in this case this edge B is guided in these displacements by a system of slides 19 slidably mounted inside the rails 21 integral with the nacelle 1.

Figure 6:
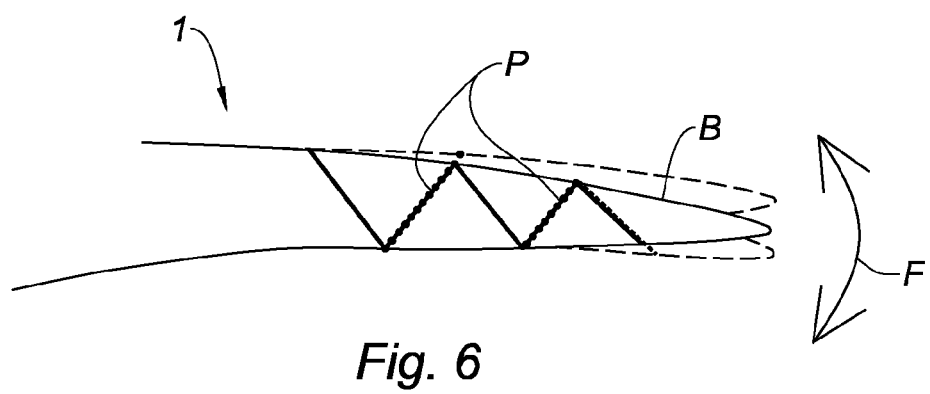

In the example shown in FIG. 6, the piezoelectric elements P are stacked inside the downstream edge B of the nacelle 1, so as to form the equivalent of actuating rods.

Thus, by subjecting these piezoelectric elements to appropriate electrical voltages, the rods they form can extend or retract.

By correctly arranging such rods inside the edge B of the nacelle 1, the desired deformations outwardly or inwardly of the nacelle can be obtained, as indicated by the arrows F and the dotted lines shown in FIG. 6.

Figure 7:
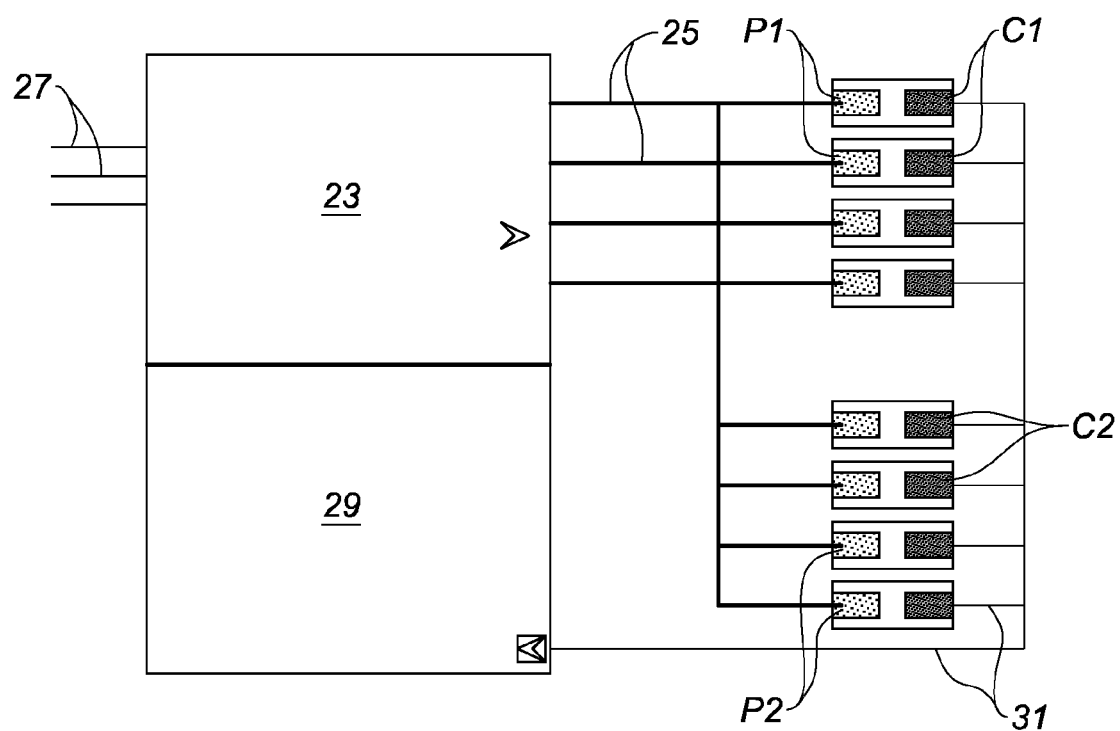
FIG. 7 is a schematic view of a control circuit of a variable-section nozzle according to the present disclosure.

A set of controls of the variable-section nozzle in accordance with the present disclosure is shown in FIG. 7.

As shown in this figure, this set of controls comprises an electronic supervision module electrically connected to the piezoelectric actuators P1, P2 by a circuit 25 and supplied with a power current by a circuit 27.

This set of controls further comprises an electronic acquisition module 29, connected by an electrical circuit 31 to a plurality of piezoelectric sensors C1, C2.

The electronic supervision module 23 and the electronic acquisition module 29 are interfaced with each other, so that the set shown in FIG. 7 forms a servo loop.

More specifically, when it is desired to increase or reduce the variable-section nozzle, a command is sent to the electronic supervision circuit 23, which will send via the circuit 25 electrical information to the piezoelectric actuators P1, P2, allowing making the articulation or deformation of the rear edge of the nacelle 1, as indicated above.

The piezoelectric sensors C1, C2, placed so as to be able to detect the movements of the displaced or deformed portion of the downstream edge of the nacelle, in turn send to the electronic acquisition modules 29 electric information representative of this displacement or of this deformation.

Communication between the module 29 and the module 23 allows acting on the piezoelectric actuators P1, P2 until the desired position or deformation is obtained.

As can therefore be understood, this set of controls uses the dual property of the piezoelectric elements, consisting not only in the ability to be deformed and thus to cause a movement when they are subjected to an electric field variation, but also the ability to generate such an electric field variation when they are subjected to displacing forces.

As an indication, the voltages used with the piezoelectric elements range between 100 volts and 1500 volts.

As can now be understood in the light of the foregoing description, the present disclosure provides extremely simple, lightweight and space-saving means, allowing varying the section of a nacelle nozzle.

Such variation is obtained by simply sending an appropriate electrical voltage into correctly placed piezoelectric elements.

The present disclosure is particularly suitable for next-generation nacelles, intended for engines with a very high dilution rate, which are thinner and shorter.

So far, it has never been thought to use piezoelectric elements to make variable-section nozzles, because it was thought that the forces involved were incompatible with those that such elements allow to provide.

It was during repeated experiments that the applicant realized that by stacking such elements, actuating forces entirely compatible with those required in the nacelle could be obtained, and this, with an overall weight of these elements significantly lower than that of the conventional hydraulic or electromechanical actuators.

Of course, the present disclosure is not limited to the forms described and shown, provided as simple examples.

What is claimed is:

1. A variable-section nozzle for an aircraft nacelle, the variable-section nozzle comprising at least one deformable portion which is movable between a narrow section position and a wide section position, the variable-section nozzle comprising:
    a displacement device configured for displacing said at least one deformable portion between said narrow section position and said wide section position, wherein said displacement device comprises piezoelectric actuators stacked inside a downstream edge of said at least one deformable portion, wherein said piezoelectric actuators cause displacement of said deformable portion when subjected to an electrical voltage, and wherein said displacement device further comprises a control device to control said piezoelectric actuators; and
    a plurality of piezoelectric sensors positioned with the piezoelectric actuators at the downstream edge and configured to detect movements of the downstream edge of the at least one deformable portion,
    wherein said at least one deformable portion comprises at least one hinged flap configured to rotate radially inwardly, with respect to a longitudinal axis extending through said variable-section nozzle, and
    wherein a movement amplification device is directly connected with said piezoelectric actuators and is operatively connected to the at least one hinged flap, the movement amplification device comprising a lever arm configured to convert a small displacement of said piezoelectric actuators into a predetermined displacement of said at least one hinged flap.

2. The variable-section nozzle according to claim 1, wherein the at least one deformable portion rotates around a corresponding axis which is substantially perpendicular to the longitudinal axis of the aircraft nacelle.

3. The variable-section nozzle according to claim 1, wherein said lever arm is hinged around an axis placed downstream of the aircraft nacelle.

4. The variable-section nozzle according to claim 1, wherein said control device for controlling comprise an electronic supervision module configured to send the electrical voltage into said piezoelectric actuators, and an electronic acquisition module configured to receive a position voltage from said piezoelectric sensors, said electronic supervision and electronic acquisition modules defining a servo loop.

5. The variable-section nozzle according to claim 1, wherein each piezoelectric actuator comprises a piezoelectric element which comprises a multilayer complex, formed with piezo-ceramic crystals sandwiched between at least two layers of epoxy.

6. The variable-section nozzle according to claim 5, wherein said at least two layers of epoxy are sandwiched between at least two layers of polyimides, each layer of polyimide comprising embedded electrodes.

7. A nacelle for an aircraft turbojet engine comprising said variable-section nozzle according to claim 1.

* * * * *